United States Patent
Latsko (10) Patent No.: US 11,343,396 B2
(45) Date of Patent: *May 24, 2022

(54) SYSTEM FOR EXTENDING A PRINTER INPUT AND A PRINTER OUTPUT

(71) Applicant: John Latsko, Chandler, AZ (US)

(72) Inventor: John Latsko, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,087

(22) Filed: Jul. 21, 2020

(65) Prior Publication Data

US 2020/0351412 A1  Nov. 5, 2020

Related U.S. Application Data

(63) Continuation-in-part of application No. 16/292,058, filed on Mar. 4, 2019, now Pat. No. 10,717,623, which is a continuation-in-part of application No. 16/164,787, filed on Oct. 18, 2018, now Pat. No. 10,752,460, application No. 16/935,087, which is a continuation-in-part of application No. 29/739,451, filed on Jun. 25, 2020, which is a continuation-in-part (Continued)

(51) Int. Cl.
  *B65H 31/02* (2006.01)
  *H04N 1/00* (2006.01)
  *B65H 1/26* (2006.01)
  *B65H 1/04* (2006.01)

(52) U.S. Cl.
  CPC .......... *H04N 1/00533* (2013.01); *B65H 1/04* (2013.01); *B65H 1/266* (2013.01); *B65H 31/02* (2013.01); *H04N 1/0053* (2013.01); *H04N 1/00538* (2013.01); *B65H 2402/46* (2013.01); *B65H 2405/1122* (2013.01); *B65H 2405/11164* (2013.01); *B65H 2801/15* (2013.01)

(58) Field of Classification Search
  CPC .......... B65H 31/20; B65H 2405/11164; B65H 2405/1122; B65H 2405/112; B65H 2405/11161; B65H 2402/46; B65H 2405/1116; B65H 2402/30; B65H 2402/31; B65H 2402/34; B65H 2402/341; B65H 2402/342; B65H 2402/343; B65H 2402/344; B65H 2407/21; B65H 2405/1134; G03G 15/6514; H04N 1/00533; H04N 1/0053; H04N 1/00538
  See application file for complete search history.

(56) References Cited

U.S. PATENT DOCUMENTS

2002/0054381 A1 * 5/2002 Iwase ................... B65H 3/0661
                                              358/498

* cited by examiner

*Primary Examiner* — Jeremy R Severson (57) ABSTRACT

A system for extending a printer output and a printer output allows a printer to hold longer pieces of paper. The system includes a base, an extension arm, a support stand, a crossbar, a desktop printer, and an output extension clip. The base provides a structural platform to hold pieces of paper. The extension arm provides a lengthening element to hold longer pieces of paper if the base is not long enough. The support stand provides a structural reinforcement which maintains the system in a raised position from a table surface or similar. The crossbar provides a structural reference bar which is used to attach the support stand to the base. The desktop printer includes an input tray and output paper catch. The base attaches to the input tray to extend the input tray. The output extension clip attaches to the output paper catch to extend the output paper catch.

13 Claims, 10 Drawing Sheets

Related U.S. Application Data of application No. 16/292,058, filed on Mar. 4, 2019, now Pat. No. 10,717,623.

(60) Provisional application No. 62/573,937, filed on Oct. 18, 2017, provisional application No. 62/658,451, filed on Apr. 16, 2018.

SYSTEM FOR EXTENDING A PRINTER INPUT AND A PRINTER OUTPUT

The current application is a continuation-in-part (CIP) application of a U.S. non-provisional application Ser. No. 29/739,451 filed on Jun. 25, 2020. The U.S. non-provisional application Ser. No. 29/739,451 is a CIP application of the U.S. non-provisional application Ser. No. 16/292,058 filed on Mar. 4, 2019. The U.S. non-provisional application Ser. No. 16/292,058 claims a priority to the U.S. non-provisional application Ser. No. 16/164,787 filed on Oct. 18, 2018. The U.S. non-provisional application Ser. No. 16/164,787 claims a priority to the U.S. provisional application Ser. No. 62/658,451 filed on Apr. 16, 2018 and a priority to the U.S. provisional application Ser. No. 62/573,937 filed on Oct. 18, 2017.

FIELD OF THE INVENTION

The present invention relates generally to printers. More specifically, the present invention is a system for extending a printer input and a printer output which allows a printer to print out longer pieces of paper.

BACKGROUND OF THE INVENTION

Printers, copiers, and related devices have been essential tools for commercial and residential use. In general, printers are peripheral devices connected to a computer or similar device to allow users to make physical representations on paper or similar material of graphics or text. Most printers comprise a number of trays on which stacks of paper are placed to be fed into the printer. In addition, one or more trays are positioned at the exit of the printer to receive the printed pages. It is common for many printers to have a number of trays of fixed length and width so only a specific size of paper can be used with the printers. Newer printers offer more functional trays which offer a way to accommodate different sizes of papers. While these newer trays provide more functionality than older trays, few or none provide ways to extend the length of the trays to accommodate longer sizes of paper. More importantly, there are few or none other alternative methods to extend the functionality of the trays of printers, especially the OKI data printers, and more specifically, the OKI C532dn printer. The OKI C532dn printer is a color printer built to support small workgroups and businesses that require expanded performance with excellent HD color output. Normally, the OKI C532dn printer allows a user to print on both sides of a paper which can be up to 14 inches long. However, if one were to use a paper longer than 14 inches, then the printer has a hard time correctly pulling the paper into the printer. Consequently, front to back registration on a ballot cannot be properly achieved. Therefore, a device which allows the user to utilize the OKI C532dn printer with paper longer than 14 inches is necessary and beneficial.

Therefore, it is an objective of the present invention to provide a system for extending a printer input and a printer output for the OKI C532dn printer. Another objective of the present invention is to provide a system which allows the user to utilize paper longer than 14 inches with the OKI C532dn printer. Another objective of the present invention is to provide a system for the OKI C532dn printer which is easy to install and easy to use. Another objective of the present invention is to provide a system for the OKI C532dn printer which does not require the user to modify or alter the structure of the OKI C532dn printer. Additional advantages of the present invention will be set forth in part in the description which follows, and in part will be obvious from the description, or may be learned by practice of the invention. Additional advantages of the present invention may be realized and attained by means of the instrumentalities and combinations particularly pointed out in the detailed description of the invention section. Further benefits and advantages of the embodiments of the present invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention.

The present invention is a system for extending a printer input and a printer output that allows a printer to print out longer pieces of paper. In reference to FIGS. 1 through 10, the present invention comprises a base 1, an extension arm 5, a support stand 11, a crossbar 14, an output extension clip 34, and a desktop printer 31. The base 1 provides a structural platform in order for the present invention to hold pieces of paper. The extension arm 5 provides a lengthening element in order for the present invention to hold longer pieces of paper if the base 1 is not long enough. The support stand 11 provides a structural reinforcement which maintains the present invention in a raised position from a table surface or similar. The crossbar 14 provides a structural reference bar which is used to attach the support stand 11 to the base 1. The output extension clip 34 attaches to an output paper catch 33 of the desktop printer 31, thus, allowing the desktop printer 31 to hold longer pieces of outputted paper. The desktop printer 31 is preferably an OKI C532dn printer.

Figure 1:
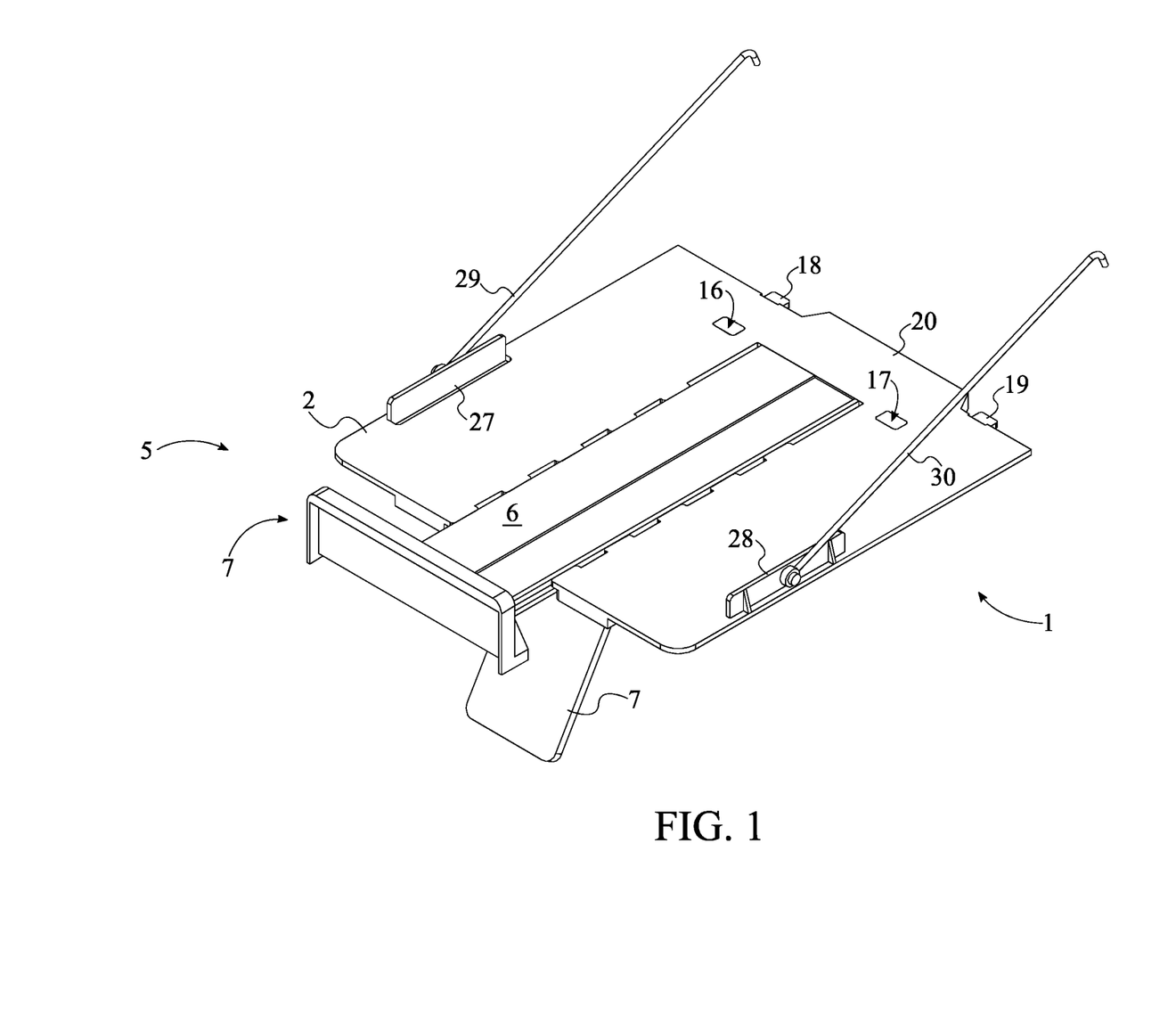
FIG. 1 is a perspective view of the present invention.
Figure 2:
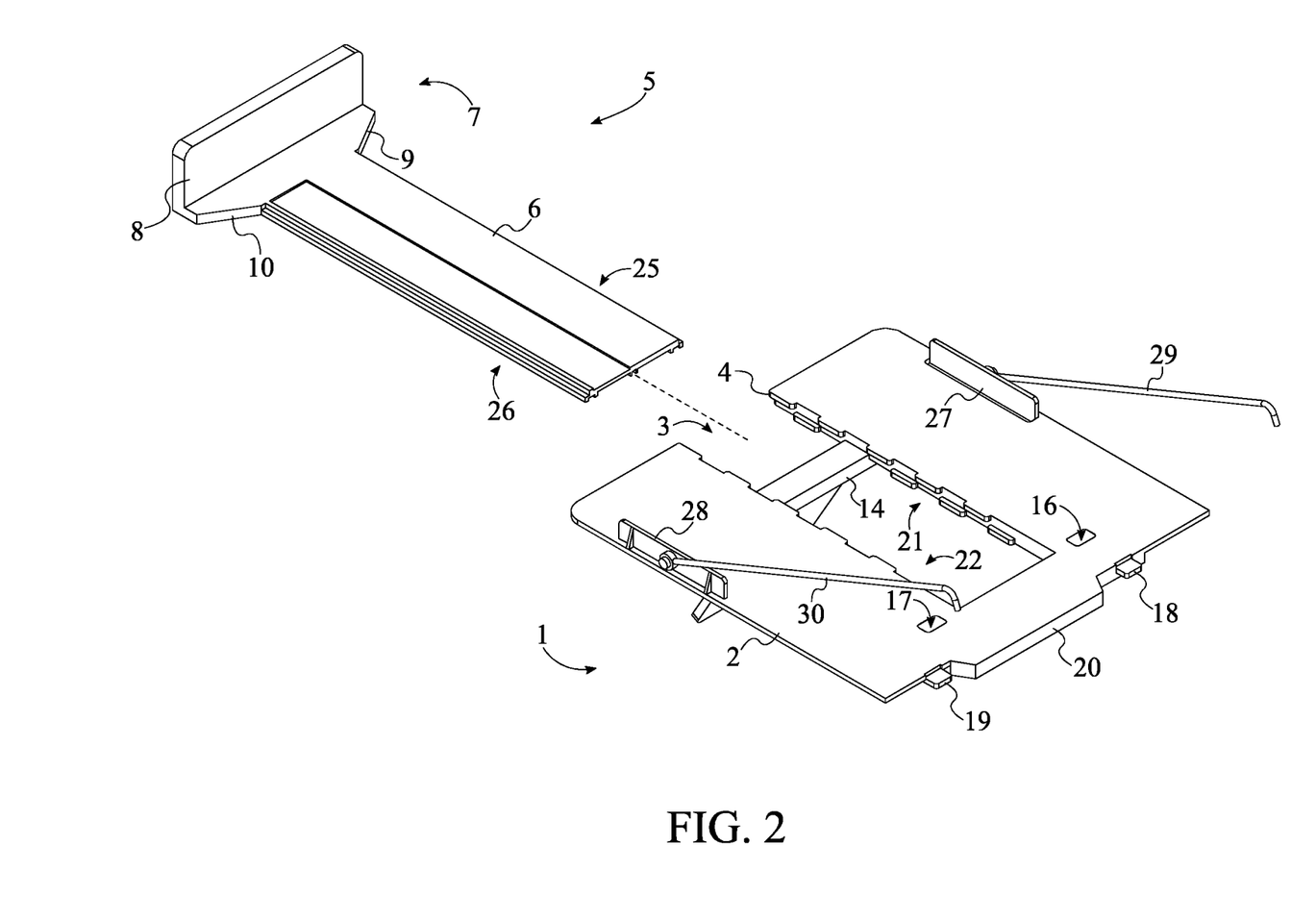
FIG. 2 is an exploded perspective view of the present invention displaying the extension arm detached from the base.
Figure 7:
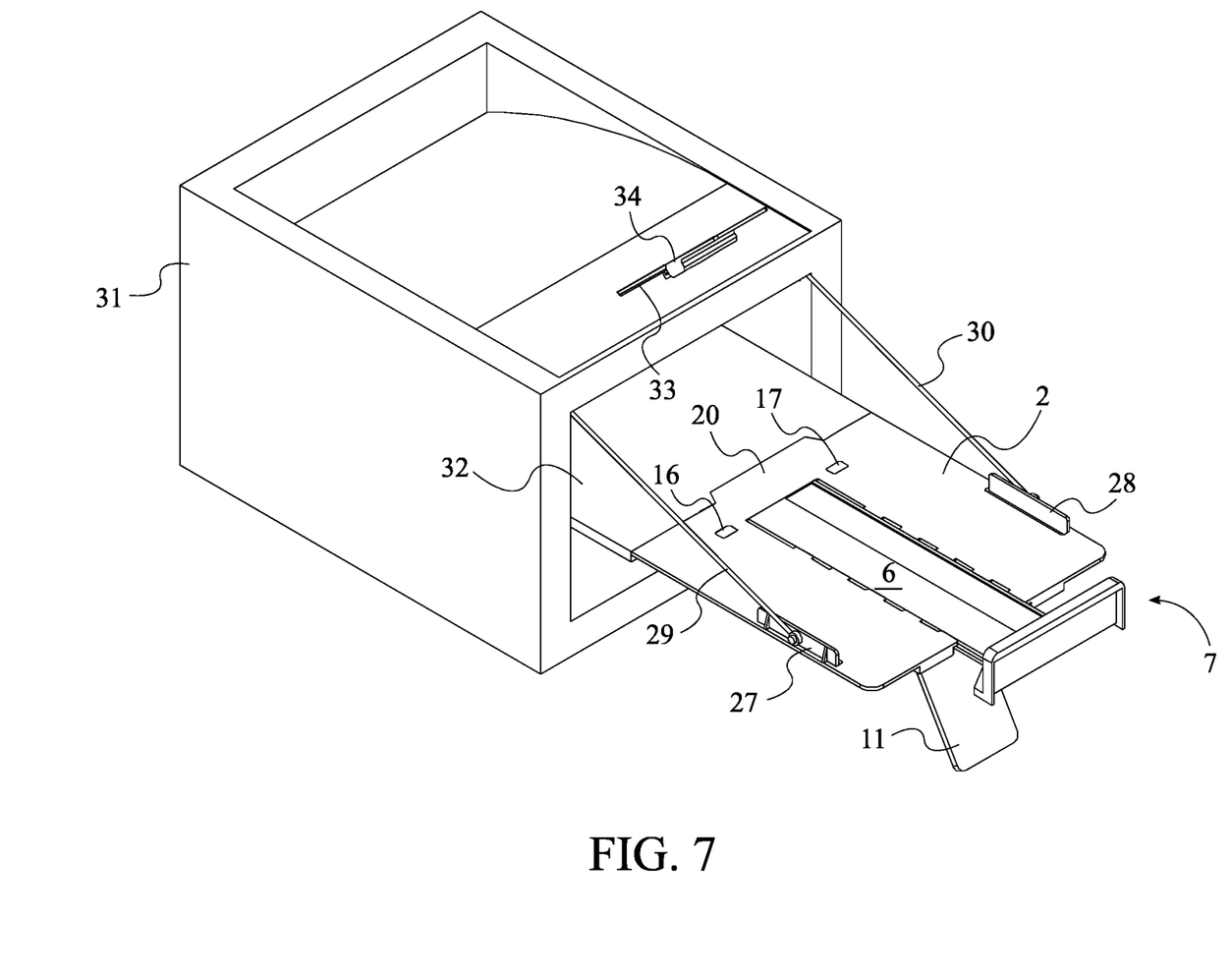
FIG. 7 is a left-side top perspective view of the present invention displaying the desktop printer.
Figure 8:
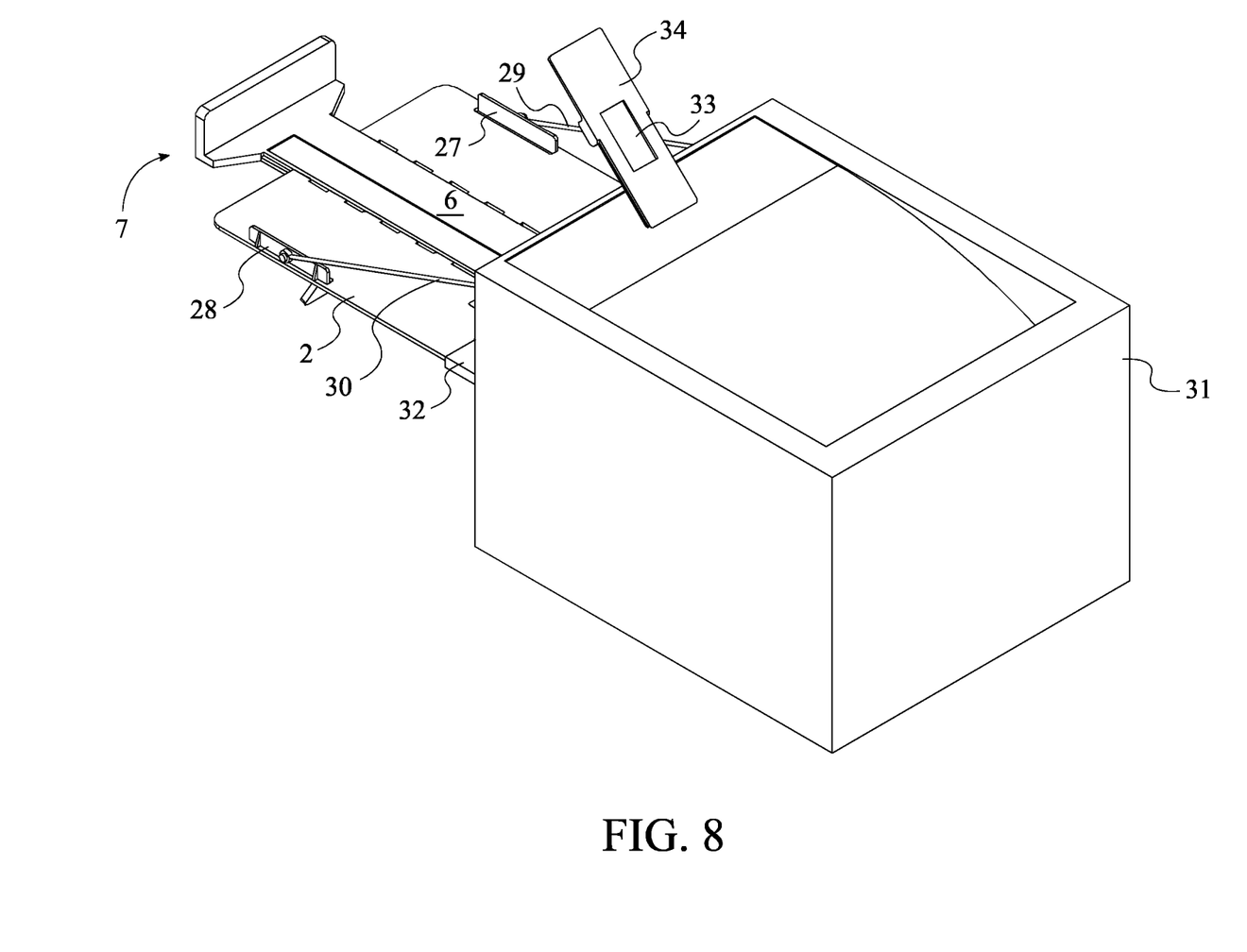
FIG. 8 is a right-side top perspective view displaying the desktop printer.

The general configuration of the aforementioned components allows a printer, when engaged to the present invention, to hold longer pieces of paper. With reference to FIGS. 1 and 2, the base 1 comprises a panel body 2 and a slot 3. The panel body 2 provides a flat platform that acts as a tray for paper. The slot 3 is a cutout of the base 1 that is used to receive the extension arm 5. The extension arm 5 comprises a stopper 7 and an elongated body 6. The stopper 7 provides a restraining structure that is used to maintain paper within the boundaries of the present invention. The desktop printer 31 further comprises an input tray 32. The input tray 32 is a tray that holds pieces of paper to be used for printing. The slot 3 traverses normal and through the panel body 2 and laterally traverses into the panel body 2. This arrangement properly positions the slot 3 with the panel body 2. With reference to FIG. 7, the input tray 32 is laterally mounted to the panel body 2, opposite an inlet 4 of the slot 3. This arrangement allows the base 1 to be secured to the desktop printer 31. The elongated body 6 is slidably attached into the slot 3. This arrangement allows the elongated body 6 to be removed from the slot 3 when desired and to be slid along the slot 3 in accordance to the size of the paper held by the present invention. The stopper 7 is terminally connected to the elongated body 6 and is positioned offset from the slot 3 when the elongated body 6 is attached to the slot 3. This arrangement allows the stopper 7 to effectively restrain paper within the boundaries of the present invention. The crossbar 14 is connected onto the panel body 2 in order for the crossbar 14 to be rigid enough to receive the support stand 11. The crossbar 14 is positioned across the slot 3 and positioned adjacent to the inlet 4 of the slot 3. This arrangement properly positions the crossbar 14 in reference to the slot 3 in order to receive the support stand 11 in a manner that the support stand 11 properly maintains the present invention in a lifted position. The support stand 11 is laterally attached to the crossbar 14. This arrangement allows the support stand 11 to maintain the base 1 in a raised positioned from a table surface or similar. The support stand 11 and the elongated body 6 are positioned opposite to each other about the crossbar 14. This arrangement properly positions the support stand 11 to support the bottom of the base 1. With reference to FIG. 8, the output extension clip 34 is attached along the output paper catch 33. Thus, the output extension clip 34 is fully secured to the output paper catch 33 while extending the length the output paper catch 33 further allowing the desktop printer 31 to hold longer pieces of outputted paper.

Figure 5:
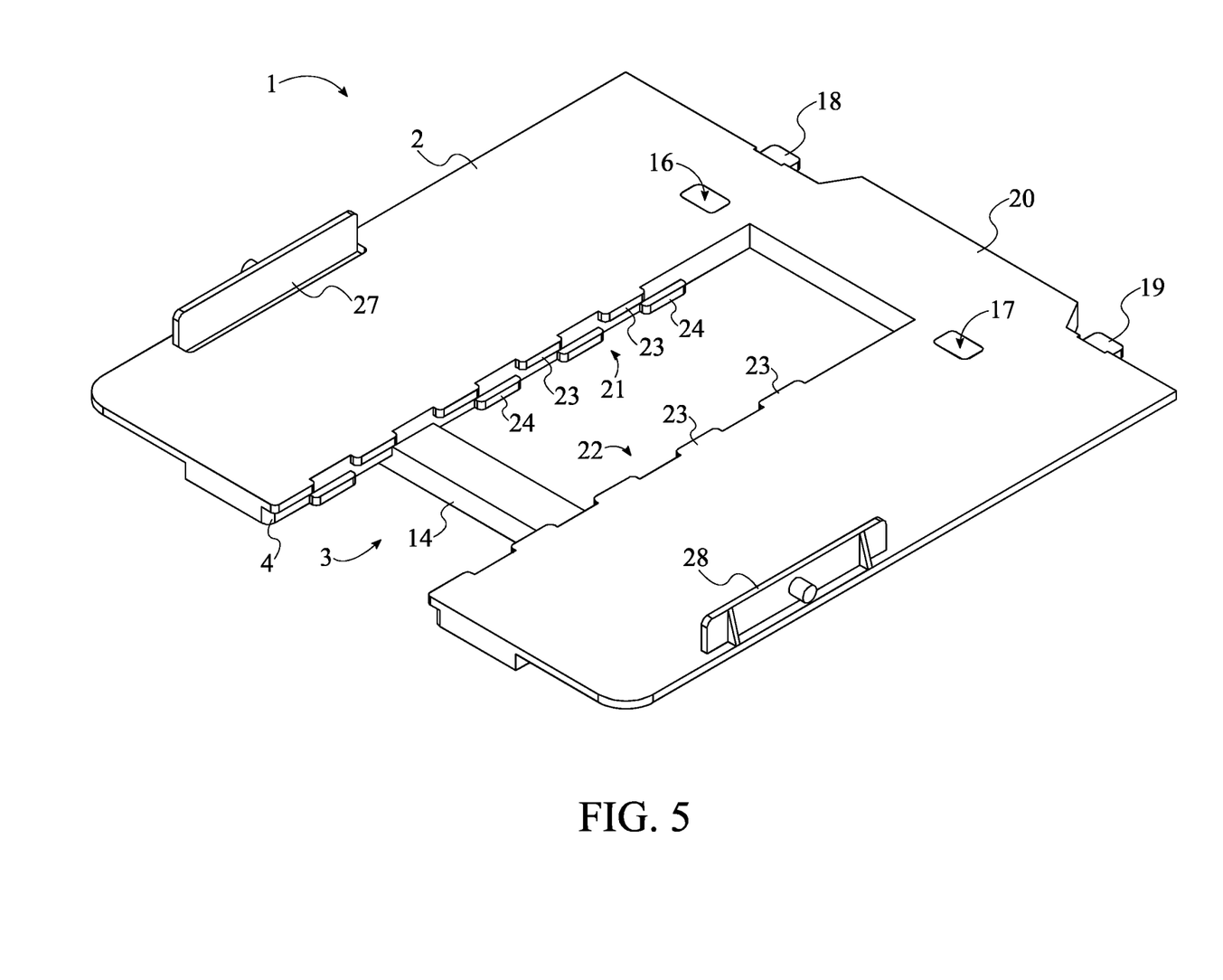
FIG. 5 is a perspective view of the base of the present invention.

With reference to FIGS. 1 and 5, the present invention may further comprise a first receptacle 16 and a second receptacle 17. The first receptacle 16 and the second receptacle 17 are recessed areas of the panel body 2 which are used to properly secure the present invention to a printer. The first receptacle 16 and the second receptacle 17 are integrated into the panel body 2, and the slot 3 is positioned in between the first receptacle 16 and the second receptacle 17. Moreover, the first receptacle 16 and the second receptacle 17 are positioned offset from the crossbar 14 along the slot 3. This arrangement properly positions the first receptacle 16 and the second receptacle 17 on the panel body 2 with reference to the crossbar 14 and the slot 3 in order for the first receptacle 16 and the second receptacle 17 to be used to secure the present invention to a printer.

With reference to FIGS. 1 and 5, the present invention may further comprise a flat wedge 20. The flat wedge 20 is a specifically designed protrusion which is used to precisely fit the present invention with a printer. The flat wedge 20 is positioned coplanar with the panel body 2 and peripherally connected to the panel body 2. Furthermore, the flat wedge 20 is positioned opposite to the inlet 4 of the slot 3 across the panel body 2. This arrangement properly positions the flat wedge 20 at the front of the panel body 2 with reference to the slot 3. The panel body 2 is laterally attached to the input tray 32 by the wedge 20. Thus, the base 1 can be secured to the desktop printer 31.

With reference to FIGS. 1 and 5, the present invention may further comprise a first tab 18 and a second tab 19. The first tab 18 and the second tab 19 are protrusions which are used to properly secure the present invention to a printer. The first tab 18 and the second tab 19 are peripherally connected to the panel body 2, and the slot 3 is positioned in between the first tab 18 and the second tab 19. Furthermore, the first tab 18 and the second tab 19 are positioned opposite to the inlet 4 of the slot 3 across the panel body 2. This arrangement properly positions the first tab 18 and the second tab 19 at the front of the panel body 2 with reference to the slot 3 in order the for the first tab 18 and the second tab 19 to be used to secure the present invention to a printer. The flat wedge 20 is positioned in between the first tab 18 and the second tab 19 in order to allow the flat wedge 20, the first tab 18, and the second tab 19 to work in conjunction to secure the base 1 to a printer. Further, the panel body 2 is laterally attached to the input tray 32 by the first tab 18 and the second tab 19. Thus, the base 1 is further secured to the desktop printer 31.

With reference to FIGS. 1 and 2, the present invention may further comprise a first track 21, a second track 22, a first rail 25, and a second rail 26. The first track 21 and the second track 22 are path guides which allow the slot 3 to be slidably engaged by the elongated body 6. The first rail 25 and the second rail 26 are guide protrusions which allow the elongated body 6 to be slidably engaged within the slot 3. The first rail 25 and the second rail 26 are laterally connected onto the elongated body 6 and positioned opposite to each other about the elongated body 6. This arrangement properly positions the first rail 25 and the second rail 26 at the sides of the elongated body 6. The first track 21 and the second track 22 are connected along the slot 3 and positioned opposite to each other across the slot 3. This arrangement properly positions the first track 21 at one side of the slot 3 and the second track 22 at the other side of the slot 3. In order for the elongated body 6 to be slidably attached to the slot 3, the first rail 25 is engaged into the first track 21, and the second rail 26 is engaged into the second track 22.

In order to maintain the first rail 25 inside the first track 21 and the second rail 26 inside the second track 22 and with reference to FIG. 5, the first track 21 and the second track 22 each further comprise a series of upper tabs 23 and a series of lower tabs 24. The series of upper tabs 23 and the series of lower tabs 24 provide a pressure fit for each engagement of the first rail 25 and the first track 21 and of the second rail 26 and the second track 22. The series of upper tabs 23 is interspersed amongst the series of lower tabs 24 along the slot 3. Moreover, the series of upper tabs 23 and the series of lower tabs 24 are positioned offset from each other. This arrangement allows the elongated body 6 to be maintained within the slot 3 while still being able to slide along the slot 3 through different pressure points provided by series of upper tabs 23 and the series of lower tabs 24.

With reference to FIGS. 1 and 5, the present invention further comprises a first restraint 27 and a second restraint 28. The first restraint 27 and second restraint 28 maintain pieces of paper within the boundaries of the present invention. Additionally, the first restraint 27 and the second restraint 28 are used as guides for the pieces of paper when being inserted inside the printer. The first restraint 27 and the second restraint 28 are laterally connected to the panel body 2 and positioned opposite to each other across the panel body 2. This arrangement properly positions the first restraint 27 and the second restraint 28 on the panel body 2. Moreover, the slot 3 is positioned in between the first restraint 27 and the second restraint 28. This arrangement allows the first restraint 27 and the second restraint 28 to effectively maintain pieces of paper within the boundaries of the present invention.

With reference to FIG. 1, the present invention may further comprise a first suspender 29 and a second suspender 30. The first suspender 29 and the second suspender 30 provide supports to sustain the load provided by pieces of paper placed on the present invention. Additionally, the first suspender 29 and the second suspender 30 are used to secure the present invention to a printer. The first restraint 27 is terminally and pivotably connected to the first suspender 29. This arrangement provides a fixed end for the first suspender 29 and allows the user to attach a free end of the first suspender 29 to a printer. The first restraint 27 is tethered to the desktop printer 31 by the first suspender 29. Thus, the first suspender 29 further secures the base 1 to the desktop printer 31. Similarly, the second restraint 28 is terminally and pivotably connected to the second suspender 30. This arrangement provides a fixed end for the second suspender 30 and allows a user to attach a free end of the second suspender 30 to a printer. The second restraint 28 is tethered to the desktop printer 31 by the second suspender 30. Thus, the second suspender 30 further secures the base 1 to the desktop printer 31.

Figure 3:
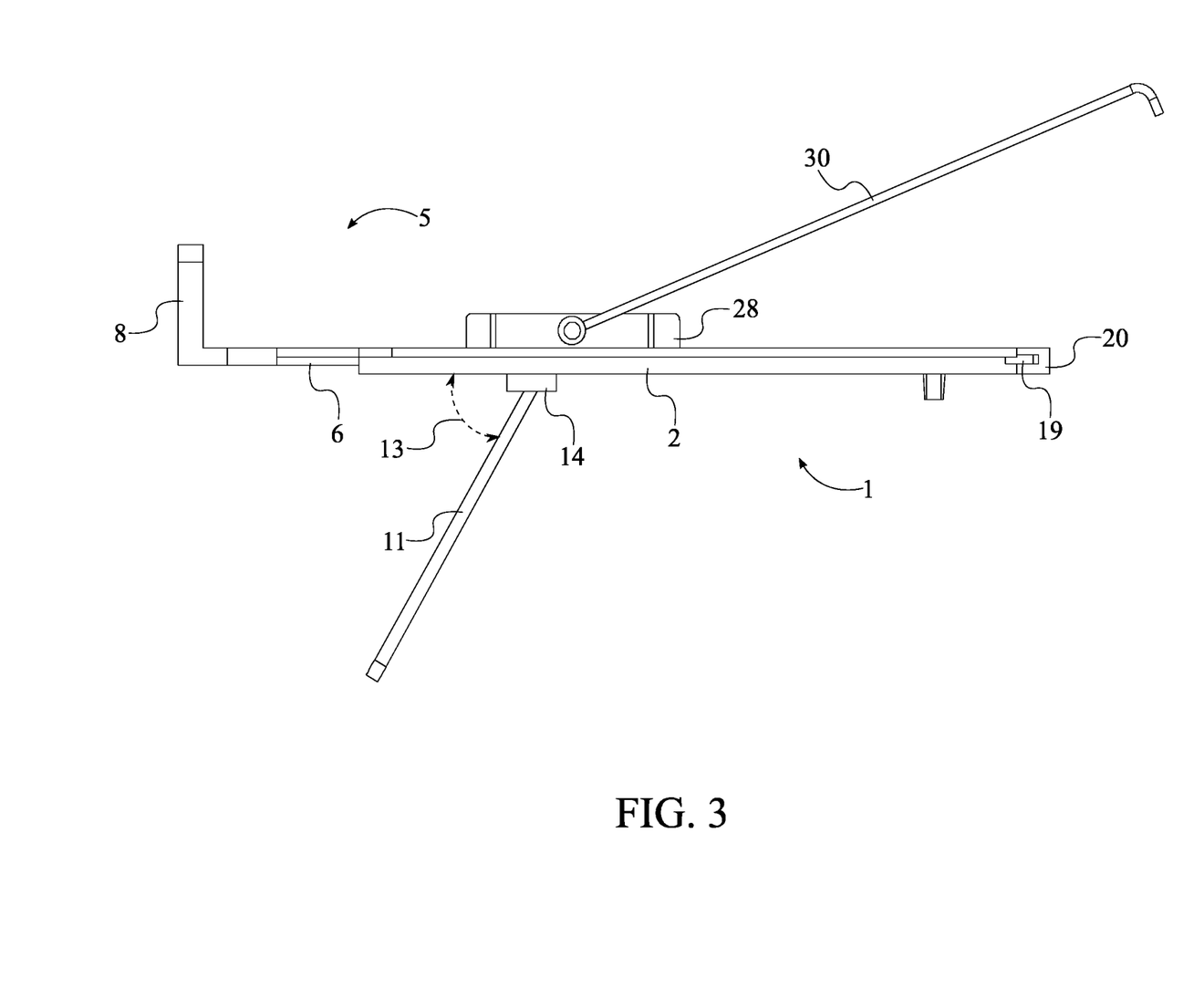
FIG. 3 is a right-side view of the present invention.

In order for the support stand 11 to properly maintain the base 1 at a raised positioned and with reference to FIG. 3, the support stand 11 is oriented at an angle 13 with the panel body 2. Furthermore, the support stand 11 is oriented towards the inlet 4 of the slot 3. This arrangement properly orients the support stand 11 in order to effectively carry the load of the present invention while maintain the present invention in a raised position.

Figure 4:
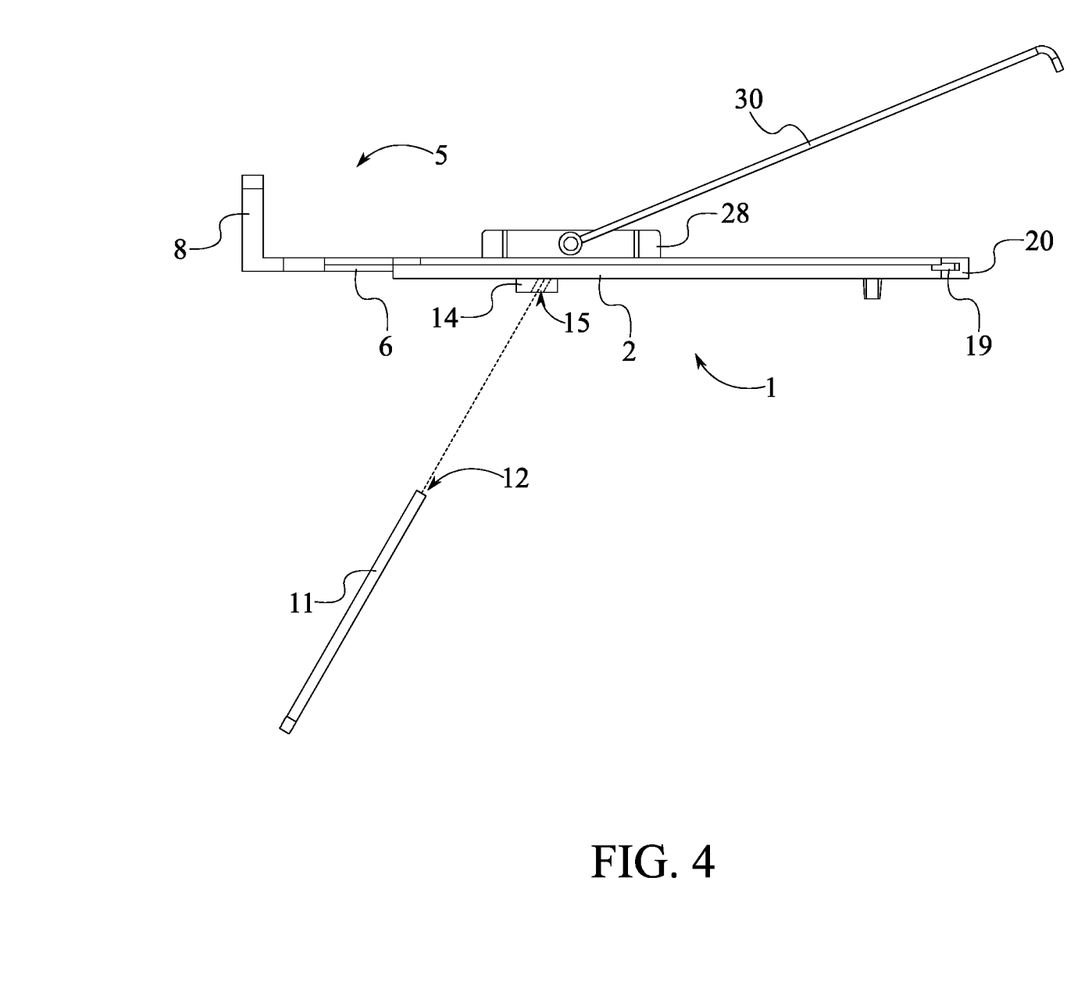
FIG. 4 is an exploded right-side view of the present invention displaying the support stand detached from the base.

With reference to FIG. 4, the present invention may further comprise a stand head 12 and a head-receiving slot 15. The stand head 12 provides a specifically designed portion in order to attach the support stand 11 to the crossbar 14. The head-receiving slot 15 provides a recessed area in order for the crossbar 14 to receive the support stand 11. The stand head 12 is terminally connected to the support stand 11. This arrangement properly positions the stand head 12 in order for the support stand 11 to raise the base 1 in the maximum capability. The head-receiving slot 15 laterally traverses into the crossbar 14. This arrangement provides a specifically designed recess to receive the support stand 11. In order to fully secure the support stand 11 to the crossbar 14, the stand head 12 is engaged into the head-receiving slot 15.

Figure 6:
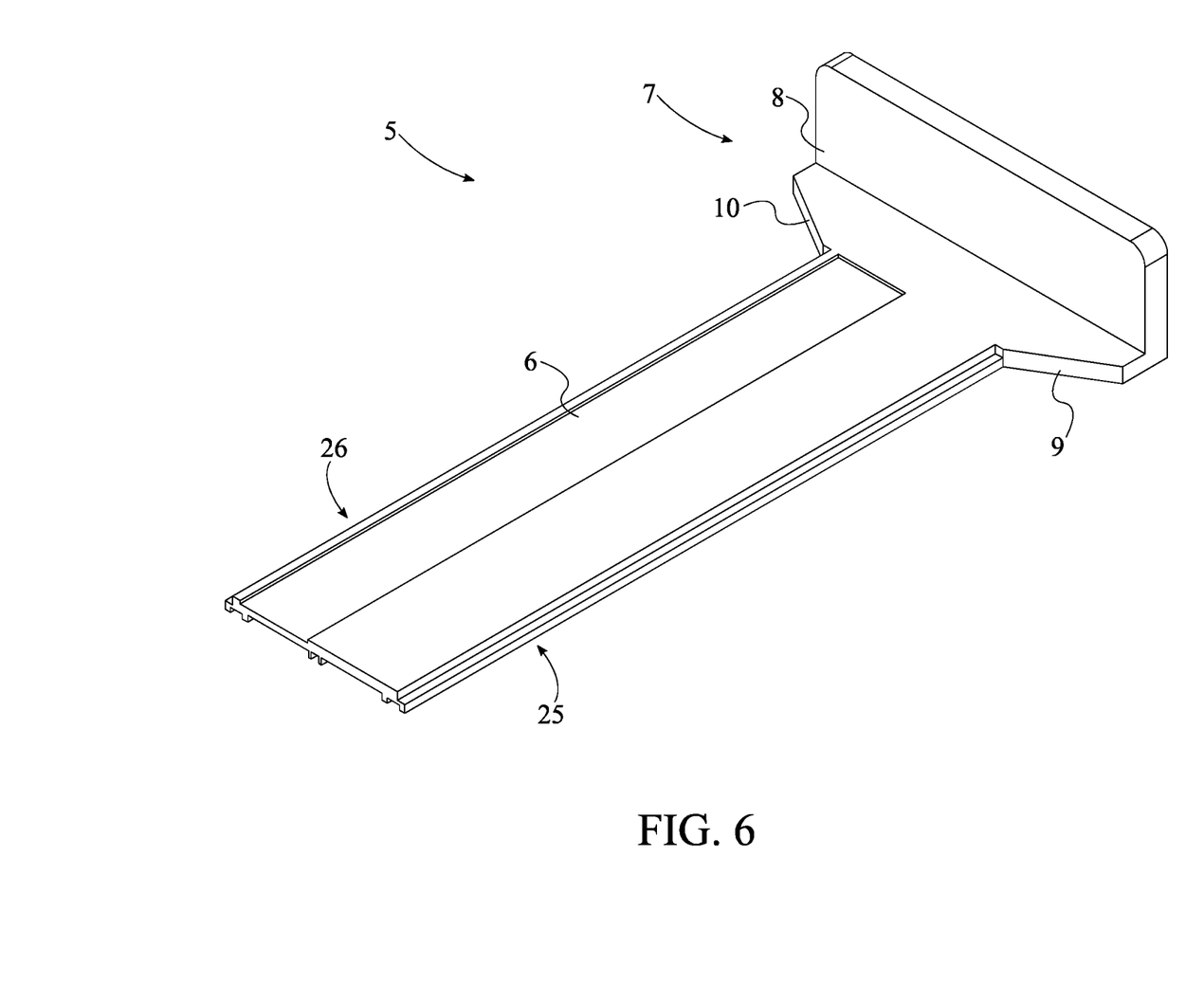
FIG. 6 is a perspective view of the extension arm of the present invention.

In order for the stopper 7 to effectively maintain paper within the boundaries of the present invention and with reference to FIG. 6, the stopper 7 further comprises a bracing wall 8. The bracing wall 8 provides a structural barrier that prevents paper from sliding off the present invention. The elongated body 6 is positioned normal to the bracing wall 8. This arrangement properly positions the bracing wall 8 in order to effectively prevent paper from sliding along the elongated body 6 and falling off the present invention.

In order for the connection between the stopper 7 and the elongated to be supported and with reference to FIG. 6, the stopper 7 comprises a first counterfort 9 and a second counterfort 10. The first counterfort 9 is connected in between the elongated body 6 and the bracing wall 8, and the second counterfort 10 is connected in between the elongated body 6 and the bracing wall 8. This arrangement allows the first counterfort 9 and the second counterfort 10 to support the connection between the stopper 7 and the elongated body 6. Moreover, the first counterfort 9 and the second counterfort 10 are positioned opposite to each other about the elongated body 6. This arrangement properly positions the first counterfort 9 and the second counterfort 10 to support each side of the stopper 7.

Figure 9:
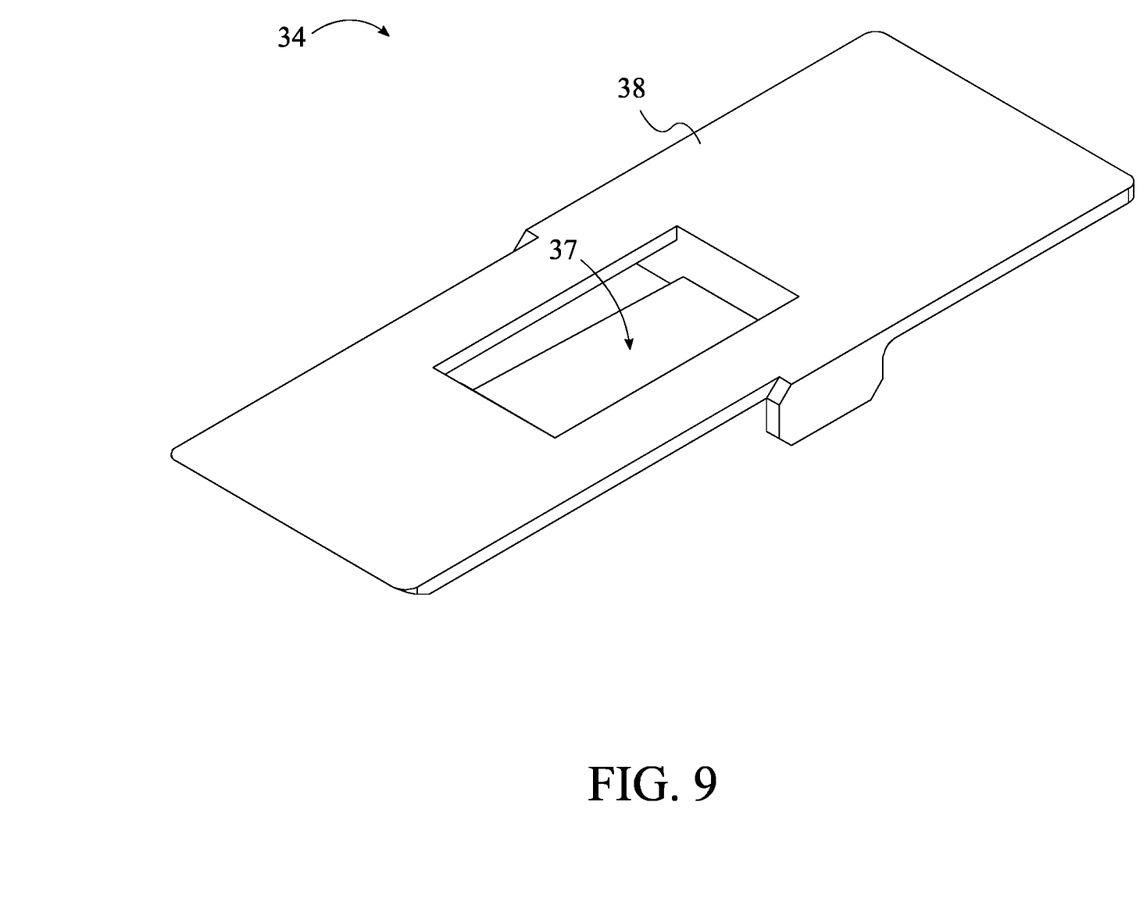
FIG. 9 is a perspective view of the output extension clip.
Figure 10:
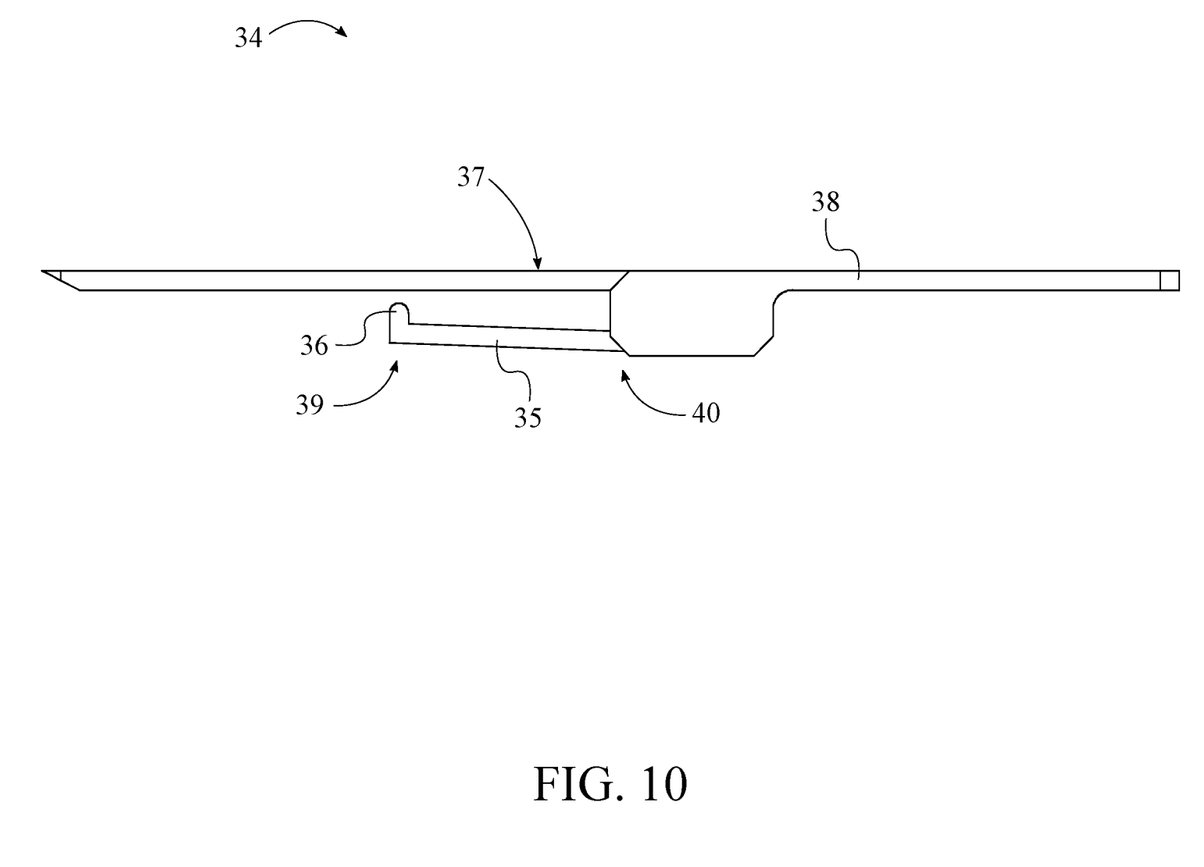
FIG. 10 is a right-side view of the output extension clip.

In order for the output extension clip 34 to be secured to the output paper catch 33 and with reference to FIGS. 9 and 10, the output extension clip 34 comprises a clip arm 35, a clip barb 36, a pressure-increasing hole 37, and an elongated flat body 38. The clip arm 35 comprises a fixed arm 40 end and a free arm end 39. The pressure-increasing hole 37 traverses normal through the elongated flat body 38. The pressure-increasing hole 37 allows the output extension clip 34 to easily slide along the output paper catch 33. The clip arm 35 is positioned across the pressure-increasing hole 37. This arrangement allows the clip arm 35 and clip barb 36 to apply a force onto the output paper catch 33 when engaged by the output extension clip 34. The fixed arm end 40 is connected onto the elongated flat body 38, adjacent to the pressure-increasing hole 37. Thus, one end of the clip arm 35 is fixed which prevents the output paper catch 33 from sliding too far along the output extension clip 34. The clip barb 36 is connected onto the clip arm 35, adjacent to the free arm end 39, and the clip barb 36 is oriented towards the pressure-increasing hole 37. This arrangement allows the clip barb 36 and the clip arm 35 to work in conjunction to apply a locking force onto the output paper catch 33 when engaged by the output extension clip 34. Thus, the output extension clip 34 can be secured to the output paper catch 33.

Although the invention has been explained in relation to its preferred embodiment, it is to be understood that many other possible modifications and variations can be made without departing from the spirit and scope of the invention as hereinafter claimed.

What is claimed is:

1. A system for extending a printer input and a printer output comprises:
    a base;
    an extension arm;
    a support stand;
    a crossbar;
    an output extension clip;
    a desktop printer;
    the base comprises a panel body and a slot;
    the extension arm comprises a stopper and an elongated body;
    the desktop printer comprises an input tray and an output paper catch;
    the slot traversing normal and through the panel body;
    the slot laterally traversing into the panel body;
    the input tray being laterally mounted to the panel body, opposite an inlet of the slot;
    the elongated body being slidably attached into the slot;
    the stopper being terminally connected to the elongated body;
    the stopper being positioned offset from the slot;
    the crossbar being connected onto the panel body;
    the crossbar being positioned across the slot;
    the crossbar being positioned adjacent to the inlet of the slot;
    the support stand being laterally attached to the crossbar;
    the support stand and the elongated body being positioned opposite to each other about the crossbar; and
    the output extension clip being attached along the output paper catch.

2. The system for extending a printer input and a printer output as claimed in claim 1 comprises:
    a first receptacle;
    a second receptacle;
    the first receptacle and the second receptacle being integrated into the panel body;

the slot being positioned in between the first receptacle and the second receptacle; and the first receptacle and the second receptacle being positioned offset from the crossbar along the slot.

3. The system for extending a printer input and a printer output as claimed in claim 1 comprises:
- a flat wedge;
- the flat wedge being positioned coplanar with the panel body;
- the flat wedge being peripherally connected to the panel body; and
- the flat wedge being positioned opposite to the inlet of the slot across the panel body; and
- the panel body being laterally attached to the input tray by the wedge.

4. The system for extending a printer input and a printer output as claimed in claim 3 comprises:
- a first tab;
- a second tab;
- the first tab and the second tab being peripherally connected to the panel body;
- the slot being positioned in between the first tab and the second tab;
- the first tab and the second tab being positioned opposite to the inlet of the slot across the panel body;
- the flat wedge being positioned between the first tab and the second tab; and
- the panel body being laterally attached to the input tray by the first tab and the second tab.

5. The system for extending a printer input and a printer output as claimed in claim 1 comprises:
- a first track;
- a second track;
- a first rail;
- a second rail;
- the first rail and the second rail being laterally connected onto the elongated body;
- the first rail and the second rail being positioned opposite to each other about the elongated body;
- the first track and the second track being connected along the slot;
- the first track and the second track being positioned opposite to each other across the slot;
- the first rail being engaged into the first track; and
- the second rail being engaged into the second track.

6. The system for extending a printer input and a printer output as claimed in claim 5 comprises:
- the first track and the second track each comprise a series of upper tabs and a series of lower tabs;
- the series of upper tabs being interspersed amongst the series of lower tabs along the slot; and
- the series of upper tabs and the series of lower tabs being positioned offset from each other.

7. The system for extending a printer input and a printer output as claimed in claim 1 comprises:
- a first restraint;
- a second restraint;
- the first restraint and the second restraint being laterally connected the panel body;
- the first restraint and the second restraint being positioned opposite to each other across the panel body; and
- the slot being positioned in between the first restraint and the second restraint.

8. The system for extending a printer input and a printer output as claimed in claim 7 comprises:
- a first suspender;
- a second suspender;
- the first restraint being terminally and pivotably connected to the first suspender;
- the first restraint being tethered to the desktop printer by the first suspender;
- the second restraint being terminally and pivotably connected to the second suspender; and
- the second restraint being tethered to the desktop printer by the second suspender.

9. The system for extending a printer input and a printer output as claimed in claim 1 comprises:
- the support stand being oriented at an angle with the panel body; and
- the support stand being oriented towards the inlet of the slot.

10. The system for extending a printer input and a printer output as claimed in claim 9 comprises:
- a stand head;
- a head-receiving slot;
- the stand head being terminally connected to the support stand;
- the head-receiving slot laterally traversing into the crossbar; and
- the stand head being engaged into the head-receiving slot.

11. The system for extending a printer input and a printer output as claimed in claim 1 comprises:
- the stopper comprises a bracing wall; and
- the elongated body being positioned normal to the bracing wall.

12. The system for extending a printer input and a printer output as claimed in claim 11 comprises:
- the stopper further comprises a first counterfort and a second counterfort;
- the first counterfort being connected in between the elongated body and the bracing wall;
- the second counterfort being connected in between the elongated body and the bracing wall; and
- the first counterfort and the second counterfort being positioned opposite to each other about the elongated body.

13. The system for extending a printer input and a printer output as claimed in claim 1 comprises:
- the output extension clip comprises a clip arm, a clip barb, a pressure-increasing hole, and an elongated flat body;
- the clip arm comprises a fixed arm end and a free arm end;
- the pressure-increasing hole traversing normal through the elongated flat body;
- the clip arm being positioned across the pressure-increasing hole;
- the fixed arm end being connected onto the elongated flat body, adjacent to the pressure-increasing hole;
- the clip barb being connected onto the clip arm, adjacent to the free arm end; and
- the clip barb being oriented towards the pressure-increasing hole.

* * * * *